(12) United States Patent
Mihaylov et al.

(10) Patent No.: US 7,998,441 B2
(45) Date of Patent: Aug. 16, 2011

(54) METHOD FOR SELECTIVE REMOVAL OF CADMIUM

(75) Inventors: Indje Ognianov Mihaylov, Mississauga (CA); Douglas Albert Hope, Mississauga (CA)

(73) Assignee: CVRD Inco Limited, Toronto (CA)

( * ) Notice: Subject to any disclaimer, the term of this patent is extended or adjusted under 35 U.S.C. 154(b) by 855 days.

(21) Appl. No.: 11/858,380

(22) Filed: Sep. 20, 2007

(65) Prior Publication Data

US 2009/0078649 A1    Mar. 26, 2009

(51) Int. Cl.
*B01J 45/00* (2006.01)
(52) U.S. Cl. ........ 423/100; 423/101; 210/679; 210/688; 205/560; 205/589
(58) Field of Classification Search .................. 423/100, 423/101; 210/679, 688; 205/560, 589
See application file for complete search history.

(56) References Cited

U.S. PATENT DOCUMENTS 6,428,604 B1 *  8/2002  Kerfoot et al. .................. 75/743

FOREIGN PATENT DOCUMENTS

| JP | 55-0544084 | * | 4/1980 |
| JP | 56-049785 | * | 5/1981 |

OTHER PUBLICATIONS

Translation of Kobayashi et al. "Elimination of cadmium . . . " Mizu Shori Gijutsu, 19(8), pp. 727-733,1978.*
Atia et al. "Synthesis of amine and thio chelating resins and study of their interaction with zinc(II), cadmium(II) and mercury(II) ion in their aqueous solutions", Reactive & Functional Polymers, 56(1), pp. 75-82, 2003.
Saha et al, "Sorption of trace heavy metals by thiol containing chelating resins", Solvent Extraction and Ion Exchange, 18(1), pp. 133-167, 2000.
Zuo et al. "Selective binding of mercury to thioreau-based coordinating resins", Reactive & Functional Polymers, vol. 27, No. 3, pp. 187-198.
Kobayashi et al. "Elimination of cadmium ion in waste water by adsorbents", Mizu Short Gijutsu, 19(8), pp. 727-733, 1982 (with English abstract).

* cited by examiner

*Primary Examiner* — Steven Bos
(74) *Attorney, Agent, or Firm* — Arent Fox LLP

(57) ABSTRACT

A method for selective removal of cadmium from a feed solution also containing other metals such as nickel (Ni) and/or cobalt (Co), utilizing a thiourea based ion exchange resin, and a method for eluting cadmium adsorbed on the thiourea based resin.

24 Claims, 2 Drawing Sheets

METHOD FOR SELECTIVE REMOVAL OF CADMIUM

FIELD AND BACKGROUND OF THE INVENTION

The present invention generally relates to a method for selective removal of cadmium (Cd) from a feed solution also containing other metals such as nickel (Ni) and/or cobalt (Co), utilizing a thiourea based ion exchange resin, and to a method for eluting cadmium adsorbed on the resin.

Leach liquors produced in chemical and hydrometallurgical processes frequently contain metal impurities which could adversely affect the commercial marketability or desirability of the recovered metal(s).

For example, pressure oxidative leaching (POL) of VBN (Voisey's Bay Nickel) concentrate, or the POL process, produces nickel solution which contains several (typically 2-4) mg/L of cadmium. If this cadmium is not remove from the solution prior to nickel electrowinning, the nickel cathode product will contain ~50-100 ppm cadmium. This level far exceeds the cadmium level of <5 ppm typically found in commercially available plating grade nickel.

For a more compelling discussion of POL, see U.S. Pat. No. 6,428,604 to Kerfoot et al.

Cadmium has been very low in plating grade nickel because the feed materials, such as nickel mattes or laterite sourced nickel-cobalt sulfide, typically have negligible levels of cadmium.

In hydrometallurgical base metal refining, cadmium removal is commonly practiced in zinc refining, where it is removed by cementation with zinc dust. This is possible because cadmium is a more noble metal than zinc. Since cadmium is less noble than nickel and cobalt, it is not possible to cement it using zinc dust from nickel and/or cobalt solutions—unless significant nickel and/or cobalt cementation can be tolerated. Removal of cadmium to very low levels from nickel or cobalt solutions by precipitation as a metal sulfide, by using hydrogen sulfide $H_2S$ or sodium hydrogen sulfide NaSH), is possible but with co-precipitation of nickel or cobalt. For example, a precipitation circuit operated for cadmium removal by $H_2S$ from a concentrated (about 90 g/L) cobalt solution, resulted in precipitation of cadmium as sulfide, however, the loss of cobalt was very significant. Also, cadmium sulfide is relatively unstable and the precipitate tends to rapidly redissolve.

Cadmium can be removed by solvent extraction from nickel or cobalt sulfate solutions using organophosphorus acid extractants. However, if the solutions also contain increasing amounts of chloride, the extraction effectiveness for cadmium is progressively reduced.

For these reasons, cadmium removal from a nickel or cobalt sulfate solution, which may contain chlorides—such as the VBN POL nickel solution, by solvent extraction with organophosphorus acid extractants, is minimal.

Although it is possible to achieve higher cadmium extraction in such SX circuits, this will also result in significant coextraction of nickel (and cobalt)—which is again undesirable.

Nickel/cobalt co-extraction is undesirable because it will represent a significant loss from the Ni/Co refining process and/or an increase in the in-process nickel recirculation load. Furthermore, it will result in lowering the Ni and Co levels in the product solutions. These solutions are also the feeds to the respective electrowinning operations for Ni and Co and the efficiency of the electrowinning (and of the entire metal refining operation) depends on maintaining high Ni and Co tenors to electrowinning.

Therefore, a successful method for Cd removal from nickel solutions must be highly selective for Cd over Ni and Co.

Two types of ion-exchange resins are known to be capable of selectively removing cadmium.

The first type is a thiol (having —SH functional group) based resin. An example of a commercially available resin is Rohm & Haas' Amberlite® GT73. Although this type of resin has been developed and is commercially used for mercury removal, it is known that it also removes cadmium. Cadmium removal using a thio resin is described in Atia et al, "Synthesis of amine and thio chelating resins and study of their interaction with zinc(II), cadmium(II) and mercury(II) ions in their aqueous solutions," Reactive & Functional Polymers, 56(1), pp. 75-82, 2003, and in Saha, et al., "Sorption of trace heavy metals by thiol containing chelating resins", Solvent Extraction and Ion Exchange, 18(1), pp. 133-167, 2000. The main disadvantages of these resins are that they are prone to oxidation and lose metal loading capacity over a few loading cycles, and the elution of the loaded metals (including cadmium) require strong acid (such as hydrochloric acid) and thiourea.

The second type of ion-exchange resins is a thiourea based resin. An example of a commercially available resin is Lanxess' Lewatit® TP 214. The thiourea resin has known applications for mercury, platinum metals, gold and silver. Cadmium removal using a thiourea based resin is described in the English language abstract of Kobayashi and Oseto, "Elimination of cadmium ion in waste water by adsorbents," Mizu Shori Gijutsu, 19(8), pp. 727-33, 1982, and in Zuo et al, "Selective binding of mercury to thiourea-based coordinating resins," Reactive & Functional Polymers, Vol. 27, No. 3, pp. 187-198, Nov. 1, 1995.

Using thiourea as an eluant for cadmium has several disadvantages: a) using thiourea solution runs the risk of leaking thiourea into the cadmium-free nickel electrolyte which is highly undesirable as thiourea has a very negative impact on the quality of the plated nickel in the downstream nickel electrowinning operation; b) Cd elution requires high consumption of thiourea as the Cd concentration in the thiourea eluate has to be kept low in order to maintain effectiveness of the elution; c) the large volume of cadmium thiourea eluate has to be oxidized (as thiourea is cancerogenic) before disposal, and this adds further to the already high cost of the elution with thiourea.

Moreover, none of the aforementioned published studies disclose using an acidic chloride solution for resin activation, followed by water elution, for elution of loaded Cd from a thiourea resin, thus avoiding the use of thiourea solution.

It is therefore particularly advantageous to develop a method for preferentially removing cadmium from a feed solution also containing, for example, cobalt and/or nickel and a method for eluting cadmium from thiourea based resins, which do not have the disadvantages associated with known prior art processes intended for a similar purpose and which do not utilize thiourea as an eluant for cadmium.

SUMMARY OF THE INVENTION

It is an object of the present invention to provide a new and improved method for treating an aqueous solution containing cadmium comprising the steps of contacting the aqueous solution with a thiourea based resin to form a cadmium-loaded resin and a cadmium-depleted solution, separating the cadmium-loaded resin from the cadmium-depleted solution, contacting the cadmium-loaded resin with an acidic chloride solution, and eluting the cadmium-loaded resin with water to obtain a cadmium eluate solution and a cadmium-depleted resin.

It is another object of the present invention to provide a method for eluting a cadmium-loaded resin comprising the steps of contacting the cadmium-loaded resin with an acidic chloride solution, and eluting the cadmium-loaded resin with water to obtain a cadmium eluate solution and a cadmium depleted resin, wherein the cadmium-loaded resin is obtained by contacting an aqueous solution containing cadmium with a thiourea based resin.

These and other objects, advantages and features of the invention will become apparent to those persons skilled in the art upon reading the details of methods of the invention and compositions used therein as more fully described below.

All publications mentioned in this application are incorporated by the reference in their entireties to disclose and describe the methods and/or materials in connection with which the publications are cited.

DETAILED DESCRIPTION OF PREFERRED EMBODIMENTS

The processes of the present invention provide improved methods for removing or reducing the cadmium content of an aqueous solution produced in a hydrometallurgical process. Process solutions which can be treated according to this invention may contain, in addition to cadmium, metals such as nickel, cobalt, zinc, manganese, calcium and magnesium. The processes of the present invention provide a unique overall processing scheme which utilizes a thiourea based resin to remove cadmium from a cadmium-containing feed, avoids the use of cost-increasing thiourea for cadmium elution, and produces a cadmium eluate solution that can be readily neutralized to precipitate the cadmium in a suitable form for disposal.

The processes according to preferred embodiments of the present invention are especially suited for preparing cadmium-free or substantially cadmium-free, nickel or cobalt solutions used in nickel, or respectively cobalt, electrowinning.

Figure 1:
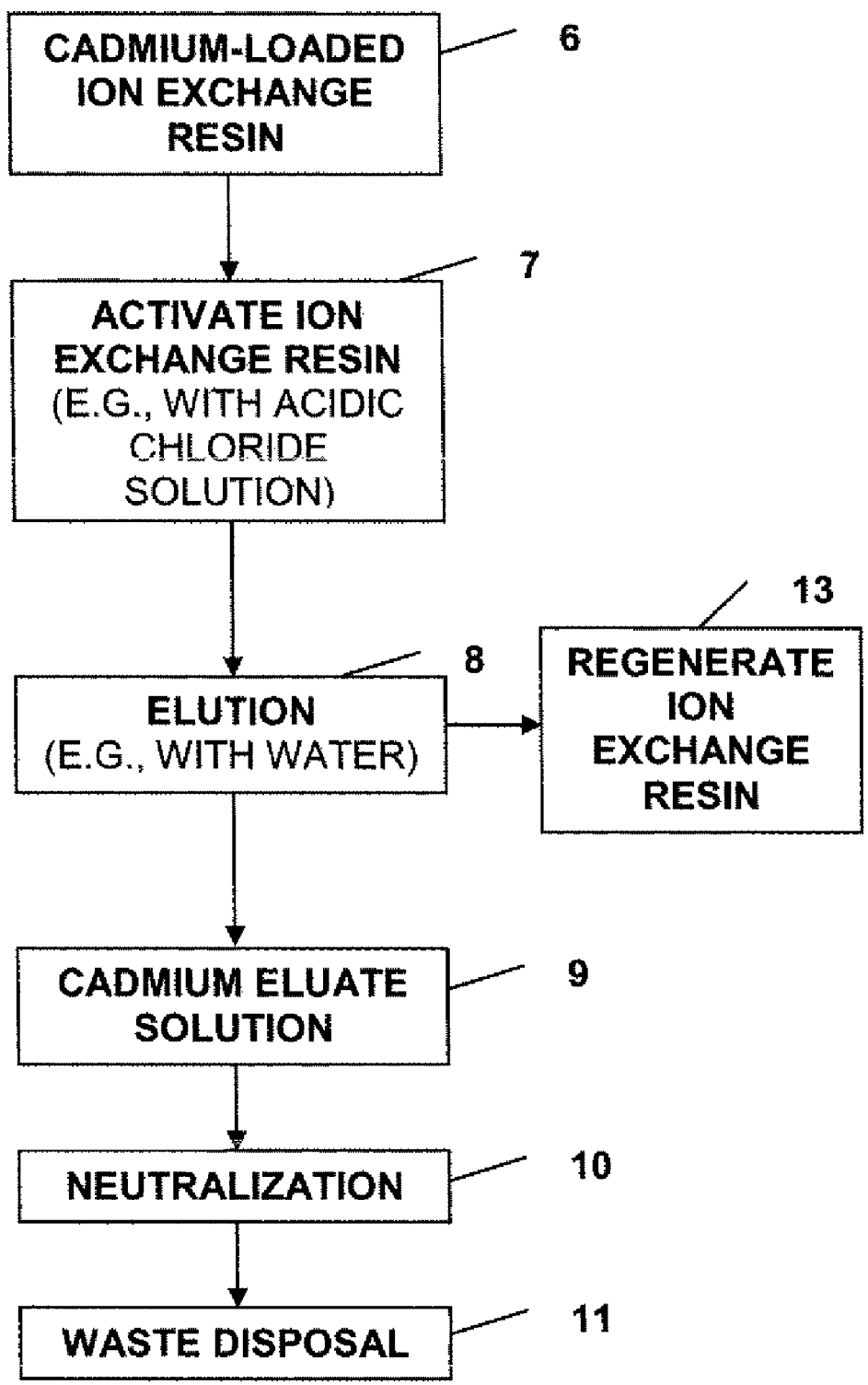
FIG. 1 is a diagrammatic representation of a process of the present invention for eluting cadmium from a cadmium-loaded resin.

Referring now to the drawings, in which like reference numerals are used to refer to the same or similar elements, FIG. 1 shows a block diagram of a resin elution process. A cadmium-containing feed solution (e.g., preferably containing about 0.5-50 mg/L of a cadmium) is first passed through or contacted with a thiourea based resin or any suitable ion exchange resin for binding cadmium over a metal ion other than cadmium. LEWATIT TP 214 (Bayer Chemicals) is an example of a thiourea based resin suitable for the methods of the present invention. The cadmium in the feed solution is bonded to or adsorbed by the resin to form a cadmium-loaded resin (step 6).

At step 7, the cadmium-loaded resin is contacted with an acidic chloride solution, preferably a hydrochloric acid solution, to activate the resin. Other suitable acidic chloride solutions include a mixture of hydrochloric or sulfuric acid and chloride salt of an alkali or alkali-earth metal. In one embodiment, for example, the acidic chloride solution contains acid at a concentration of between 0 and 20 g/L and chlorides at concentrations of between 10 and 100 g/L Cl provided from chloride salt of one or more alkali or alkali-earth metals.

Preferably, the amount of cadmium eluting into the acidic solution is kept to a minimal.

When hydrochloric acid is used, for example, its concentration should preferably be between 5 and 50 g/L, and most preferably between 20 and 30 g/L. Moreover, the amount of hydrochloric acid solution used is preferably about 4 times the amount of thiourea based resin used. It will be appreciated that other suitable acidic chloride solutions may be used at similar concentrations and can be determined by one skilled in the art by routine optimization. The acidic chloride solution may then be recycled for subsequent use (step 12 of FIG. 2) or used elsewhere in the metal refining process.

At step 8, the cadmium adsorbed on the resin is eluted with water to obtain a cadmium-depleted resin and a cadmium eluate solution (step 9). The amount of water used is preferably about 30 times the amount of thiourea based resin used. The resulting cadmium eluate solution may undergo neutralization at step 10 to precipitate the cadmium in a form more suitable for disposal (step 11). The resin with its cadmium load removed or reduced may be regenerated at step 13 for reuse in a cadmium removal/adsorption circuit. A suitable recycle line for conducting the regenerated resin is indicated as line 14 in FIG. 2.

The resin activation in step 7 and the elution of cadmium from loaded resin in step 8 may be performed separately in a container (e.g., a stirred reactor) or a conventional or any suitable ion exchange column.

Figure 2:
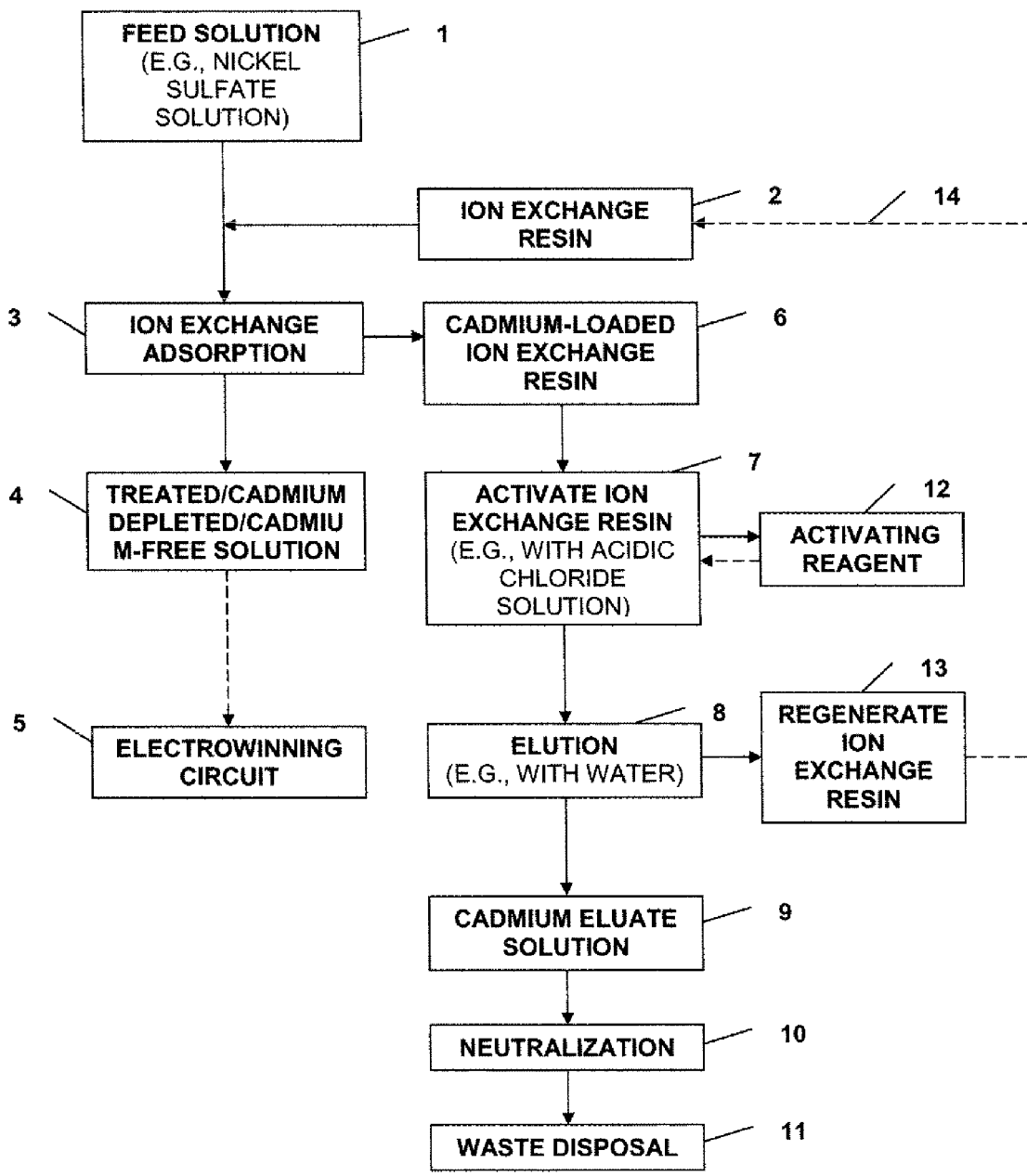
FIG. 2 is a diagrammatic representation of a process of the present invention for removal of cadmium from a cadmium-bearing feed solution.

FIG. 2 shows a block diagram of a process for selective removal of cadmium from a cadmium-containing feed solution (step 1).

Typical feeds useful for practice of the present invention include those produced in industrial or mining operations. One example is a feed stream generated by pressure oxidative leaching of Voisey's Bay nickel concentrate which typically produces a nickel electrolyte solution containing about 85 g/L of nickel and about 2 to 25 g/L of chlorides. The cadmium-containing feed streams generated by various industrial or mining operations will often contain one or more metals such as nickel, cobalt and zinc. As will be known and understood by those skilled in the art, various modifications to the process described herein will be dictated by the makeup of the feed stream.

Returning to FIG. 2, the feed solution is contacted with an ion exchange resin 2 to effect selective adsorption (step 3) of cadmium onto the resin. The resulting cadmium-loaded resin is separated from the resulting cadmium-depleted solution 4 (if necessary, such as when adsorption is conducted batchwise in a mixing vessel), and then subjected to the resin elution process described hereinabove.

In an embodiment, the step of contacting the feed solution with the ion exchange resin preferably reduces the concentration of cadmium to a desired level such that the metal sought to be recovered through a metal recovery (e.g., electrorefining) process contains less than about 5 ppm cadmium content.

In optional step 5, the cadmium-depleted solution 4 may be directed to a electrorefining or electrowinning circuit to recover metal ions from a solution as their corresponding elementary metals. Preferably, the metal, such as nickel or cobalt, obtained from electrowinning of the cadmium-depleted solution resulting from the process of the present invention contains less than about 5 ppm of cadmium.

The following example is offered by way of illustration and is not intended in limit the invention in any manner.

Example

Laboratory testwork has determined that Cd is very efficiently and selectively removed from VBN POL Ni electrolyte (~85 g/L Ni, with ~2-25 g/L Cl) using the commercially available LEWATIT TP 214 resin.

The exemplary resin elution process of the present invention can be carried out according to the steps described below, and comprises an activation step and a cadmium elution step.

In the activation step, the cadmium-loaded resin is contacted with ~30 g/L hydrochloric acid solution. The volume of acid solution required is about 4 times the volume of the resin. Because the amount of cadmium eluting into this solution is minimal, the spent hydrochloric acid solution can be used elsewhere in the nickel refining process or it can be essentially reused.

In the cadmium elution step, the resin is contacted with water to elute the cadmium. The volume of water required is up to about 30 times the volume of the resin in the column.

The contact is typically performed in, but is not limited to, a conventional fixed-bed ion-exchange column.

The resin elution process of the present invention has the following advantages over the known elution method with thiourea: a) it avoids the use of thiourea for cadmium elution; b) it uses reagents compatible with the rest of the refining process; and c) the cadmium eluate solution is only slightly acidic and can be readily neutralized to precipitate the cadmium in a suitable form for disposal.

While specific embodiments of the invention have been shown and described in detail to illustrate the application of the principles of the invention, it will be understood that the invention may be embodied otherwise without departing from such principles.

What is claimed is:

1. A method for treating an aqueous solution containing cadmium, comprising the steps of:
   contacting the aqueous solution with a thiourea based resin to form a cadmium-loaded resin and a cadmium-depleted solution;
   separating the cadmium-loaded resin from the cadmium-depleted solution;
   contacting the cadmium-loaded resin with an acidic chloride solution; and
   eluting the cadmium-loaded resin with water to obtain a cadmium eluate solution and a cadmium-depleted resin.

2. The method of claim 1, wherein the aqueous solution is obtained from a pressure oxidative leaching process.

3. The method of claim 1, wherein the aqueous solution is a sulfate solution or a mixed sulfate/chloride solution.

4. The method of claim 3, wherein the aqueous solution is a Voisey's Bay Nickel pressure oxidative leach solution.

5. The method of claim 3, wherein the aqueous solution further comprises at least one metal selected from the group consisting of nickel, cobalt, zinc, manganese, calcium and magnesium.

6. The method of claim 1, wherein the aqueous solution comprises about 0.5-50 mg/L of cadmium.

7. The method of claim 3, wherein the sulfate solution or the mixed sulfate/chloride solution comprises up to about 25 g/L of chlorides.

8. The method of claim 1, wherein the acidic chloride solution is a hydrochloric acid solution or a mixture of hydrochloric or sulfuric acid and chloride salt of an alkali or alkali-earth metal.

9. The method of claim 8, wherein the cadmium-loaded resin is contacted with the hydrochloric acid solution at a concentration of between about 5-50 g/L.

10. The method of claim 8, wherein the cadmium-loaded resin is contacted with the hydrochloric acid solution at a concentration of between about 5-50 g/L.

11. The method of claim 8, wherein the acidic chloride solution comprises sulfuric acid at a concentration between 0 and 20 g/L and chlorides at concentrations between 10 and 100 g/L Cl provided from the chloride salt of an alkali or alkali-earth metal.

12. The method of claim 1, wherein the amount of the acidic chloride solution used is up to about 4 times an amount of thiourea based resin used.

13. The method of claim 1, wherein the step of contacting the cadmium-loaded resin with an acidic chloride solution does not elute any significant amount of cadmium from the cadmium-loaded resin.

14. The method of claim 12, wherein an amount of water used is up to about 30 times the amount of thiourea based resin used.

15. The method of claim 1, wherein the contacting of the cadmium-loaded resin with the acidic chloride solution is performed in a stirred reactor.

16. The method of claim 1, further comprising:
   separating the cadmium-depleted resin from the cadmium eluate solution; and
   recycling the cadmium-depleted resin for adsorption of cadmium from the aqueous solution.

17. The method of claim 1, further comprising neutralizing the cadmium eluate solution to precipitate cadmium in a suitable form for disposal.

18. The method of claim 1, wherein the contacting of the cadmium-loaded resin and the acidic chloride solution is performed in a column.

19. The method of claim 1, further comprising transferring the cadmium-depleted solution to a nickel or a cobalt electrowinning circuit.

20. The method of claim 19, wherein nickel or cobalt metal obtained from electrowinning of the cadmium-depleted solution comprises less than about 5 ppm of cadmium.

21. A method for eluting a cadmium-loaded resin, comprising the steps of:
   contacting the cadmium-loaded resin with an acidic chloride solution; and
   eluting the cadmium-loaded resin with water to obtain a cadmium eluate solution and a cadmium depleted resin,
   wherein the cadmium-loaded resin is obtained by contacting an aqueous solution containing cadmium with a thiourea based resin.

22. The method of claim 21, wherein the acidic chloride solution is a hydrochloric acid solution or a mixture of hydrochloric or sulfuric acid and chloride salt of an alkali or alkali-earth metal.

23. The method of claim 22, wherein the cadmium-loaded resin is contacted with the hydrochloric acid solution at a concentration of between about 5-50 g/L, wherein an amount of hydrochloric acid solution used is about 4 times an amount of thiourea based resin used, wherein an amount of water used is about 30 times the amount of thiourea based resin used.

24. The method of claim 21, further comprising:
   separating the cadmium-depleted resin from the cadmium eluate solution; and
   recycling the cadmium-depleted resin for use in adsorption of cadmium from the aqueous solution.

* * * * *